United States Patent [19]

Stephens

[11] Patent Number: 5,033,817
[45] Date of Patent: Jul. 23, 1991

[54] SCALE FOR USE WITH OPTO-ELECTRONIC SCALE READING APPARATUS

[75] Inventor: William F. N. Stephens, Badminton, United Kingdom

[73] Assignee: Renishaw PLC, Gloucestershire, United Kingdom

[21] Appl. No.: 407,451

[22] Filed: Sep. 14, 1989

[30] Foreign Application Priority Data

Sep. 16, 1988 [GB] United Kingdom ............... 8821837

[51] Int. Cl.$^5$ .......................... G02B 5/18; H01J 3/14
[52] U.S. Cl. ....................... 350/162.17; 250/237 G
[58] Field of Search ............. 350/162.17, 162.2; 369/109; 250/231.16, 237 G; 356/354–356

[56] References Cited

U.S. PATENT DOCUMENTS

| 4,835,756 | 5/1989 | Kaku et al. | 369/109 |
| 4,959,542 | 9/1990 | Stephens | 250/237 G |
| 4,974,962 | 12/1990 | Stephens et al. | 250/237 G |

FOREIGN PATENT DOCUMENTS

PCT/GB85/-
  00600 7/1986 PCT Int'l Appl. .
PCT/GB87/-
  00471 1/1988 PCT Int'l Appl. .
PCT/GB87/-
  00472 1/1988 PCT Int'l Appl. .
1516536 7/1978 United Kingdom .
WO86/03833 7/1986 United Kingdom .

OTHER PUBLICATIONS

Publication "Diffraction Gratings", by M. C. Hutley, National Physical Laboratory Teddington, Middlesex, 1982, pp. 76–79.

Primary Examiner—Rodney B. Bovernick
Assistant Examiner—James Phan
Attorney, Agent, or Firm—Spencer & Frank

[57] ABSTRACT

A scale for use with scale reading apparatus having grooves spaced along its length at a pitch P. Each groove is made with a shape or depth variation along its length to provide a scatter mechanism for breaking up the ordered diffraction pattern which would otherwise be generated by the grating structure defined by the grooves. Methods of making the scale involve applying a transverse vibration to the cutting tool during the groove cutting operation.

14 Claims, 3 Drawing Sheets

SCALE FOR USE WITH OPTO-ELECTRONIC SCALE READING APPARATUS

The present invention relates to scales for use with opto-electronic scale reading apparatus.

BACKGROUND OF THE INVENTION

It is known from an International Application published under No. WO 86/03833 to provide opto-electronic scale reading apparatus comprising a scale defined by grooves on a tape or the like, and which is illuminated by light from a primary light source. Light from the primary light source is reflected from the scale at the grooves thereby defining a plurality of secondary light sources which are viewed by a readhead. The readhead includes a spatial filter in the form of a pair of spaced gratings, whereby a pattern of interference fringes is produced on one of the gratings referred to as the analyser grating. The pattern of fringes is sampled by a detection system to provide signals indicative of relative movement between the scale and the readhead.

It is to be understood that the term light as used throughout this specification includes not only visible light but radiation in the infra-red and ultra-violet parts of the spectrum.

Scales have traditionally been made to the quality standards of diffraction gratings with some hundreds of grooves per millimeter length of the scale being put on the scale with great accuracy. A book entitled "Diffraction Gratings" by M C Hutley includes a chapter on manufacture of gratings and explains the difficulties of the manufacture of gratings to a useably quality, and the extreme lengths to which manufacturers must go to produce straight grooves with minimal surface roughness and no jagged edges.

When the scale is illuminated, however, diffraction of the light can take place at the scale grooves giving rise to destructive interference of much of the light, so that a significant proportion of the reflected light passes to the filter along the relatively small number of directions corresponding to the diffraction orders of the wavelength of the light used to illuminate the scale.

Because of this directionality, light from some points on the scale fails to contribute to the full fringe field at the analyser grating thereby resulting in incomplete spatial filtering.

It has been proposed in UK Patent No. 1,516,536 to illuminate the scale with a diffuse light source in an attempt to produce a more diffuse secondary light source at the grooves on the scale. This proposal, however, has little or no effect on the ordered diffraction pattern which comes off the scale.

SUMMARY OF THE INVENTION

The object of the present invention is to produce a more diffuse secondary light source at the scale by providing a scatter mechanism for the incident light at the scale itself to break up the ordered diffraction at the grating structure defined by the scale grooves.

A proposal to avoid ordered diffraction from the scale has been made in International Publication No. Wo 88/00332 in which it is disclosed that diffusion at the secondary light sources can be achieved by a variation in the shape or surface finish of the grooves. The only example of shape variation given is a proposal to round off the profiles of the grooves, while an example of surface finish variation given is a proposal to choose an appropriately diffusing type of plastic for the protective coating on the scale. However, both of these examples are applied to grooves with straight edges transverse to the scale which do not of themselves provide diffusion transverse to the scale, and in the second example the use of a diffusing coating gives rise to a loss of reflectivity of the scale.

It is known from International Publication No. Wo 86/03833 to vary the spacing of the scale grooves along the scale for an entirely different reason, but this may also have some destructive effect on the ordered diffraction pattern produced by the scale.

We have found however, that since diffraction is basically an effect produced by the straightness of the grooves on the scale, such variations in the profile of the grooves or in their spacing are not totally effective in breaking up the ordered diffraction pattern.

One embodiment of the present invention achieves the effective break-up of the ordered diffraction pattern by varying the shape of the groove along its length, to produce a non-linear edge to the groove. This causes destruction to the ordered diffraction pattern by scattering the reflected light, without any loss of reflectivity from the scale.

The non-linear edge may be obtained by varying the width of the groove along its length or by varying its direction to produce a zig-zag form.

In a preferred form of the invention the depth of each groove is also varied along its length thus providing the sides of the grooves with areas inclined to the normal to the scale in the direction of the length of the groove, which will additionally scatter the incident light in the direction of the length of the scale.

Another embodiment of the invention achieves the effective break-up of the ordered diffraction pattern by forming adjacent grooves at different depths.

The variations in the width and/or depth of the grooves may be achieved using a mechanical cutting method by varying the depth of the cut as the cutting tool moves along the groove. The variation in the depth of cut can be produced by inducing a vertical chatter or vibration onto the tool during the cutting process, for example, by selecting a non-optimum rake angle for the cutting tool, or by vibrating the tool carrier.

Alternatively a sideways vibration may be induced on the cutting tool which puts bends into the groove.

Where the grooves are to be embossed onto the scale by a rolling technique, for example as described in International Publication No. WO 88/00331, the variation may be applied to the roller which is used for the embossing process. Where an etching process is used to produce the grooves the variations will be produced in the masking medium.

The variations may be random or ordered.

The variation in groove width, i.e. the excursion of the groove width from the nominal straight lines which would normally define the pitch P of the groove spacing, or the sideways displacement of the groove along its length, can range between P/10 and P/2.

The more diffuse light pattern reflected from the scale, will impinge on a greater area of the index grating of the filter and light from each part of the scale will be diffracted to a greater area of the analyser grating. This reduces any tendency of signal loss due to variations between parts of the scale because the variations will be averaged across a greater area of the detector system.

The invention is of particular benefit when used in combination with a readhead as described in International Publication No. WO 86/03833 which operates as a spatial filter. In such a case the optimum scatter angle is that which enables each point on each secondary light source to illuminate the whole of the analyser grating of the scale reader. The optimum scatter angle will depend on the optical geometry of the readhead and will be established by experiment. Too much scatter can lead to a reduction in the amount of light entering the readhead.

BRIEF DESCRIPTION OF THE DRAWINGS

Examples of the invention will now be more particularly described with reference to the accompanying drawings in which.

DESCRIPTION OF THE PREFERRED EMBODIMENTS

Figure 1:
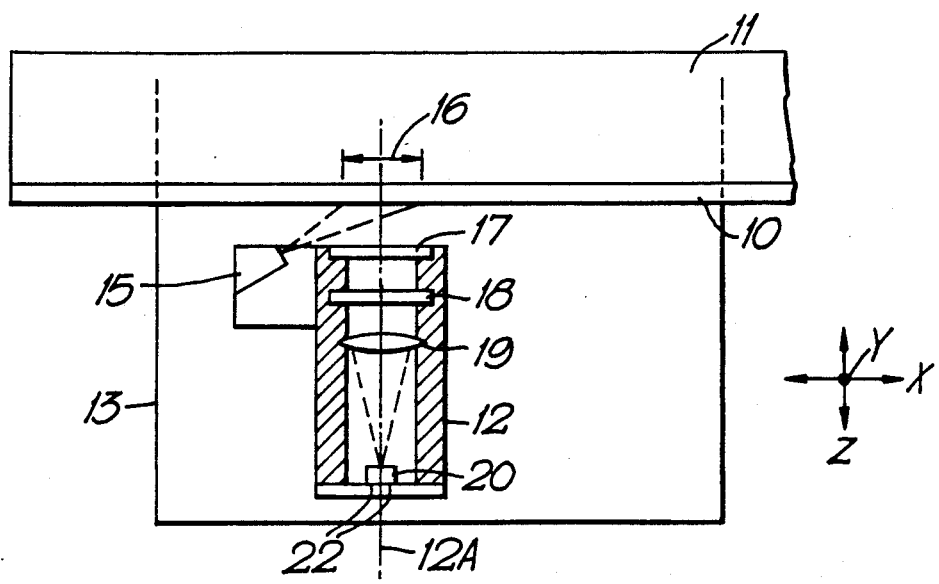
FIG. 1 illustrates a scale and readhead system incorporating the scale of the present invention.

Referring to FIGS. 1 to 7, there is shown a linear scale 10 secured to a track or tape 11. A readhead 12 is secured to a carriage 13 supported on the track 11 for linear movement in a direction X being the direction of the length of the scale. The scale has marks (FIGS. 2 to 7) defined by grooves 14 extending in a direction Y perpendicular to the direction X. The head 12 has an axis 12A extending in a direction Z perpendicular to both the directions X and Y. The head embodies a primary light source 15 positioned to illuminate the scale over a range 16. The head further comprises, in succession from the scale 10 and along the axis 12A, a first or index grating 17, a second or analyser grating 18, a lens 19, and a sensor assembly 20 preferably comprising sensor sections having output signals 22 representing movement of the carriage 13 along the track 11.

The gratings 17, 18 constitute a spatial filter. The relative position of the scale 10 and the filter is such that the light from the source 15 is reflected at the marks 14 to illuminate the filter.

The grooves 14 reflect the incident light from the primary light source 15 thus defining secondary light sources. The grating 17 is spaced from the scale 10 to be illuminated by said secondary light sources and, by diffraction, to produce a fringe field in the plane of the grating 18.

Further details of the design and operation of the scale and readhead are not provided here but may be similar to those described in International Publication No. WO 86/03833 which is hereby incorporated into this specification by reference.

Figure 2:
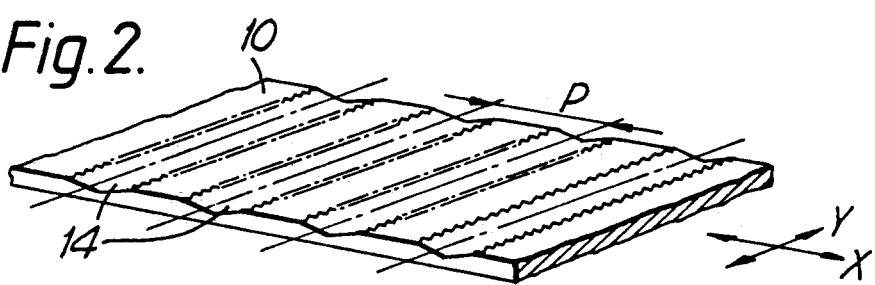
FIG. 2 illustrates in more detail the scale of FIG. 1.

FIG. 2 shows the scale in greater detail. The grooves 14 extend in direction Y transversely to the length of the scale 10 and are spaced at a nominal pitch P.

Figure 3:
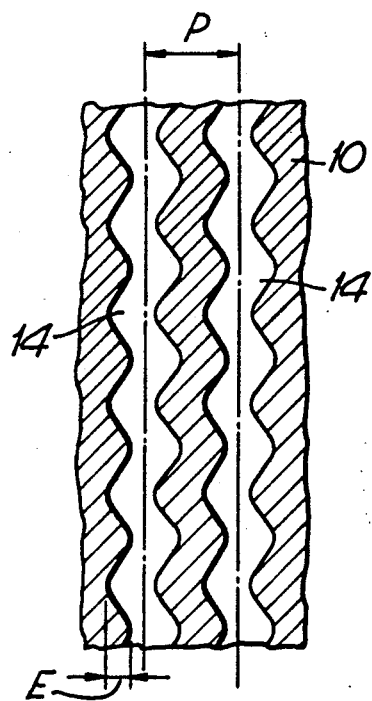
FIG. 3 is an enlarged plan view of one embodiment of a scale according to the invention.

FIG. 3 shows an embodiment of the invention in which the shape of the groove is varied, and the non-linear edge of the groove is produced by varying the direction of the groove along its length, giving a generally zig-zag form to the groove. In the embodiment shown a continuous sinusoidal variation is applied to the direction of the groove, which may, for example, be obtained by applying a sinusoidal sideways vibration to the tool which is used to scribe the grooves onto the scale.

The sideways vibration may be random or ordered, and the excursion E of the position of the edge of the groove from a nominal straight edge may lie in the range P/10 to P/2 where P is the nominal pitch of the grooves.

Figure 4:
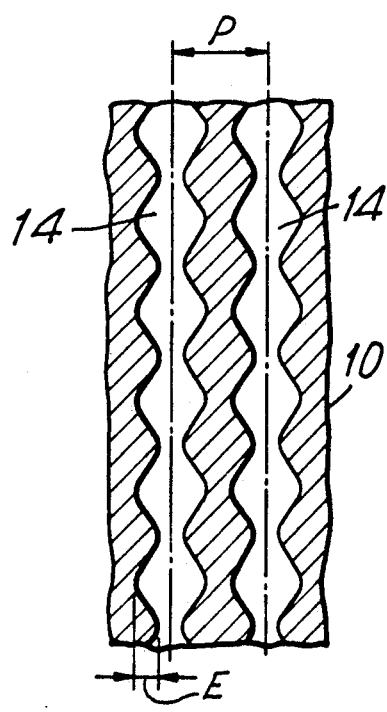
FIG. 4 is an enlarged plan view of a second embodiment of a scale according to the invention.

FIG. 4 shows an alternative embodiment of the invention in which the shape of the groove is varied, and the non-linear edge of the groove is produced by varying the width of the groove periodically along its length providing a jagged edge to the groove. In the embodiment shown, a continuous variation in the width of the groove is provided, for example by applying a vertical vibration to a wedge-shaped cutting tool which is used to scribe the grooves onto the scale.

Once again the variation in the width of the groove may be random or ordered and the excursion E of the edge of the groove from a nominal straight edge may lie in the range P/10 to P/2. The width of the groove may vary between the extreme cases of P/2, when adjacent grooves just touch, and zero when the distance between adjacent groove edges is P/2.

Figure 5:
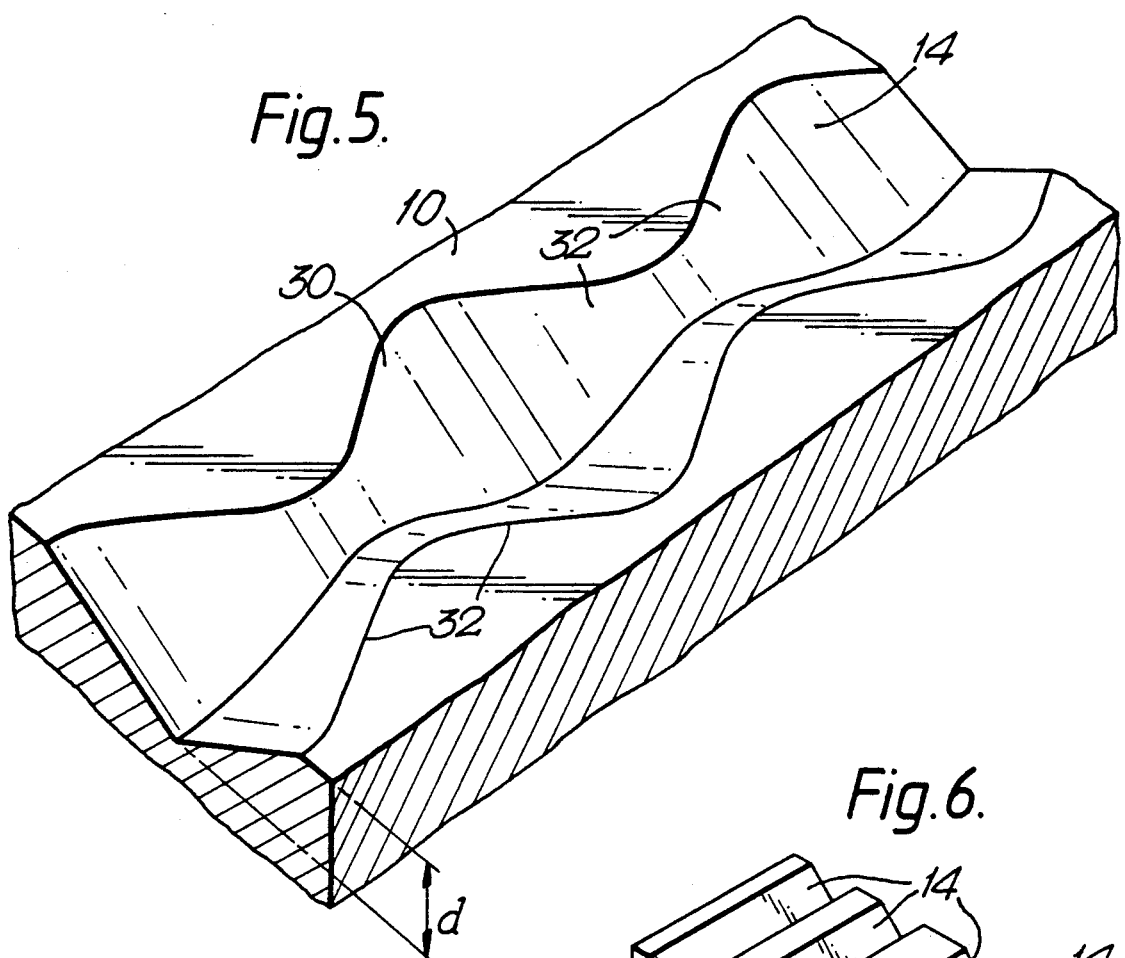
FIG. 5 is a perspective view of the scale of FIG. 4.

FIG. 5 shows in pictorial form the shape of the groove of FIG. 4 resulting from applying a depth variation on a cutting tool which is appropriately wedge-shaped. It can be seen that an additional benefit is achieved with this embodiment of the invention in that the flanks 30 of the grooves now have surfaces 32 which are inclined in the direction of the groove.

Thus in addition to breaking up the ordered diffraction in the light reflected in the direction of the length of the scale, which would normally be produced by the edges of the groove, the surfaces 32 which face in opposite directions along the groove will scatter light in these opposing directions along the groove.

Figure 6:
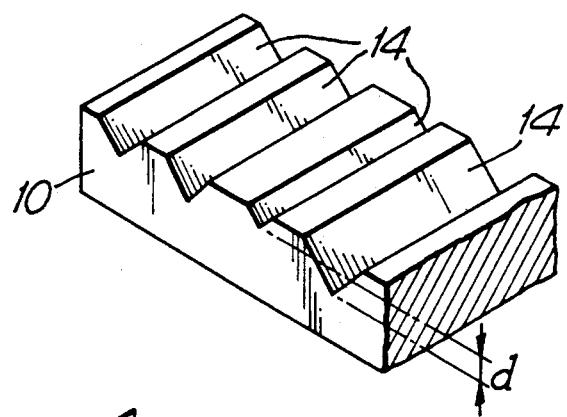
FIG. 6 is an enlarged cross-section of a portion of a scale according to a further embodiment of the invention.

An alternative scatter mechanism may be achieved as shown in FIG. 6 by forming adjacent grooves at different depths. By ensuring that the difference d in the depths of adjacent grooves is not an integer multiple of half of the wavelength of the light from the source 15, the light reflected from the different facets of the grating structure defined by the grooves travels different distances to the readhead, and the phase relationship between the reflected rays is not such as to enable an ordered diffraction pattern to be built up.

In FIG. 6 the grooves 14 are shown as vee-shaped in cross-section, but clearly other cross-sections which will provide reflected light to the readhead may be used. The grooves in this embodiment may be straight but a combination of this embodiment with the variation in shape of the groove along its length still further enhances the scattering effect and improves diffusion.

It will also be understood that the diffusion provided by the scale of the invention is achieved without loss of reflectivity of the scale.

Figure 7:
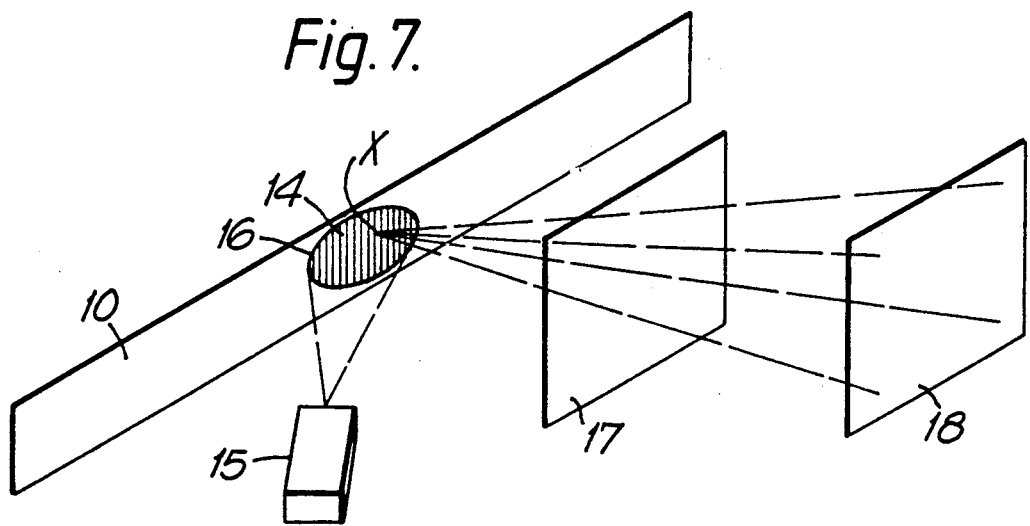
FIG. 7 illustrates the illumination of the readhead from the scale.

The degree of diffusion along the length of the groove is optimised by simple experiment to ensure that the light reflected from each groove reaches as large an area as possible of the analyser grating 18 of the readhead to participate in the fringe field produced by the readhead. This provides the best improvement in the spatial filtering process of the readhead with minimum loss of light from the system due to the diffusion process. This is illustrated in FIG. 7 in which it can be seen that each small area (point) X on the groove reflects light to all parts of the analyser grating 18 which improves the spatial filtering mechanism of the readhead. Note that the lens shown in the readhead of FIG. 1 has been removed from this illustration for clarity.

One or more of the scatter mechanisms described with reference to FIGS. 3 to 6 may be combined and there is significant flexibility allowed in the depth and/or width variations of the groove to achieve the optimum amount of diffusion. The optimum degree of scattering of the reflected light is that which is sufficient to ensure that light from each point on each groove illuminates the whole of the analyser grating.

The above-described embodiments have discussed a method of manufacture of the scale in which a cutting tool is used to scribe the pattern of grooves directly onto the scale.

In a preferred method of scale manufacture however, the groove pattern is embossed onto the scale in a continuous rolling operation. Such a rolling operation is disclosed for example, in our International Publication No. WO 88/00331.

Figure 8:
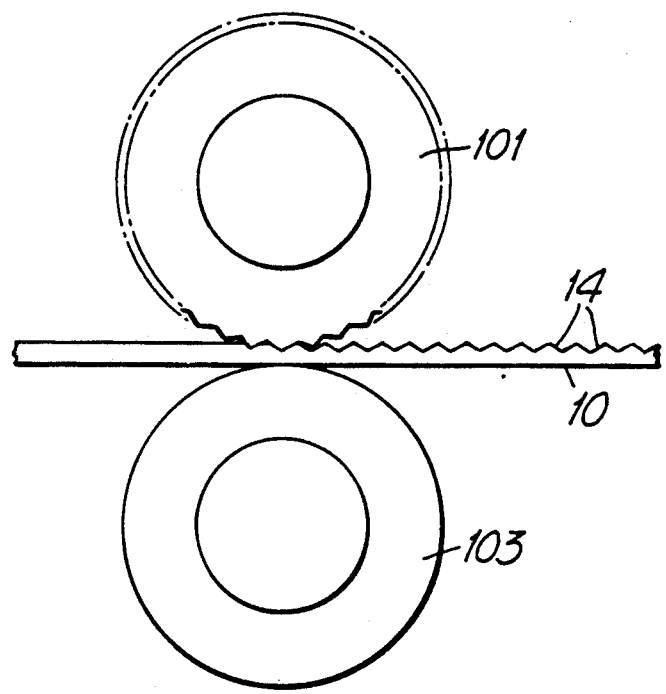
FIG. 8 illustrates a method of manufacture of the scale by embossing the pattern onto the scale from a roller.

Referring now to FIG. 8 the rolling apparatus comprises an upper, or forme roller 101, and a lower or impression roller 103. Means, not shown but understood per se are provided for driving the rollers 101, 103 and adjusting the pressure between them. The scale 10 is passed between the rollers for embossing the shape cut into the forme roller onto the scale to produce the grooves 14.

For further details of the scale design and the rolling process for use with such a scale, reference is directed to the description provided in International Publication No. WO 88/00331 which is hereby incorporated into this specification by reference. It is sufficient to say here that the type of scale is not an essential feature of the invention, which is concerned with the nature of the shape of the grooves applied to the scale.

In such a method of manufacture of a scale, the shape of the groove ultimately required on the scale has first to be cut, etched, or otherwise provided on the surface of the forme roller.

Figure 9:
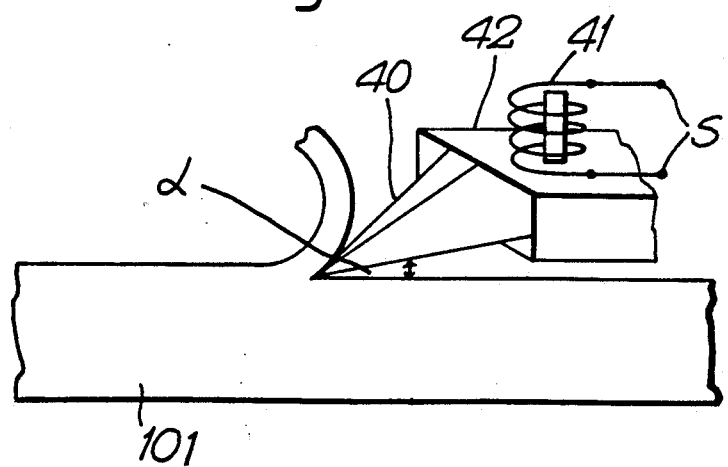
FIG. 9 illustrates the cutting of the groove shape onto the roller of FIG. 8.

This may be achieved by the use of a diamond cutting tool 40 which is of multi-faceted form as known per se, and shown in FIG. 9. The various facets of the tool give the tool a wedge shaped form in several directions whereby when a groove is cut in a surface with the tool, the width of the groove bears a direct relation to the depth of cut.

The invention makes use of this fact as shown in FIG. 9 by arranging for a vertical vibration to be applied to the tool during the cutting process. The vertical vibration may be ordered by using an electrical exciter in the form of a piezo electric crystal, or as illustrated in FIG. 9 an inductive coil 41 positioned adjacent the cutting tool holder 42.

Alternatively the vibration may be random and this may be achieved simply by selecting, by experiment a non-optimum rake angle α for the cutting, which will induce a chatter into the tool during the cutting process which will in turn put a vertical variation into the depth of cut.

I claim:

1. A scale for use with opto-electronic scale reading apparatus, said scale comprising a surface in which are formed grooves and wherein at least some of the grooves have a shape which varies along the length of the groove to provide each such groove with a non-linear edge.

2. A scale according to claim 1, wherein the variation in shape of said grooves is caused by a periodic change in direction of the grooves along their lengths.

3. A scale according to claim 2 wherein the period of said periodic variations is random.

4. A scale according to claim 2 wherein the period of said periodic variations is ordered.

5. A scale according to claim 1 wherein the variation in shape of said grooves is caused by a periodic variation in the width of the grooves along their lengths.

6. A scale according to claim 5 wherein the period of said periodic variations is random.

7. A scale according to claim 5 wherein the period of said periodic variations is ordered.

8. A scale according to claim 1 wherein two adjacent grooves are formed with different depths, the difference in the depths of said grooves being such as to prevent the establishment of an ordered diffraction pattern in light reflected from the grooves.

9. Opto-electronic scale reading apparatus comprising a scale as claimed in claim 1 in combination with means for illuminating an area of the scale and a readhead positioned adjacent said area of the scale for receiving light reflected from said area and for providing a signal in response to relative displacements taking place between the scale and the readhead.

10. Apparatus as claimed in claim 9 wherein the readhead comprises two spaced gratings acting as a spatial filter.

11. An opto-electronic scale reading apparatus comprising:
   a scale extending in a first direction and having a surface extending in a second direction substantially perpendicular to said first direction, said surface having grooves therein with lengths and widths which extend in said second and first directions respectively, at least one of said grooves having first and second spaced non-linear edges which vary in shape along the length thereof; and
   a readhead positioned adjacent said scale including
      a light source for illuminating a portion of said scale;
      a spatial filter extending in a third direction substantially perpendicular to said first and second directions, said spatial filter being positioned with respect to said scale and said light source such that the light from said light source is reflected from said grooves and impinges on said spatial filter; and
      a sensor for receiving light from said spatial filter, said sensor generating a signal corresponding to the relative displacement of said readhead and said scale.

12. An opto-electronic scale reading apparatus as claimed in claim 11 wherein said grooves are spaced by a pitch distance P, and wherein an excursion E of the position of an edge of said at least one groove from a nominal straight line is in the range P/10 to P/2.

13. An opto/electronic scale reading apparatus as claimed in claim 12 wherein the width of said at least one groove is substantially constant over its entire length.

14. An opto-electronic scale reading apparatus as claimed in claim 11 wherein said spatial filter includes spaced index and analyzer gratings.

* * * * *